(12) United States Patent
Hirakata et al.

(10) Patent No.: US 6,234,147 B1
(45) Date of Patent: May 22, 2001

(54) IGNITION TIMING CONTROL DEVICE FOR INTERNAL COMBUSTION ENGINE

(75) Inventors: Yoshiaki Hirakata; Masahiko Abe; Yasuo Iwata, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/339,930

(22) Filed: Jun. 25, 1999

(30) Foreign Application Priority Data

Jun. 25, 1998 (JP) .................................................. 10-178679

(51) Int. Cl.⁷ ........................................................ F02P 5/00
(52) U.S. Cl. .................................. 123/406.51; 123/406.52
(58) Field of Search ............................ 123/406.51, 406.52

(56) References Cited

U.S. PATENT DOCUMENTS

| | | | | |
|---|---|---|---|---|
| 4,587,938 | * | 5/1986 | Kobayashi et al. | 123/406.52 |
| 4,599,695 | * | 7/1986 | Deutsch | 123/406.51 |
| 4,626,997 | * | 12/1986 | Takeda et al. | 123/406.51 |
| 4,976,240 | * | 12/1990 | Okuda | 123/406.52 |
| 5,172,666 | * | 12/1992 | Nonaka | 123/406.42 |
| 5,222,470 | * | 6/1993 | Oonuma et al. | 123/406.52 |
| 5,681,239 | * | 10/1997 | Toukura | 123/406.51 |

FOREIGN PATENT DOCUMENTS 1-232169    9/1989   (JP) .

* cited by examiner

*Primary Examiner*—John Kwon
(74) *Attorney, Agent, or Firm*—Birch, Stewart, Kolasch & Birch, LLP

(57) ABSTRACT

An ignition timing control device for an internal combustion engine is capable of preventing shock of an engine upon rapid acceleration by suitably controlling the ignition timing of the engine. When the width of the opening of a throttle valve is kept within a specific width for a first specific time or more in a state where the opening of the throttle valve is smaller than a specific low opening and immediately after, the opening of the throttle valve is increased from the specific low opening to more than a specific high opening for a second specific time or less, it is decided that the internal combustion engine is in a rapid acceleration state. Ignition timing of the engine is therefore retarded.

8 Claims, 5 Drawing Sheets

IGNITION TIMING CONTROL DEVICE FOR INTERNAL COMBUSTION ENGINE

BACKGROUND OF THE INVENTION

1. Field of the Invention

The present invention relates to an ignition timing control device for controlling ignition timing by allowing spark discharge of an ignition plug in an internal combustion engine.

2. Description of Related Art

An ignition timing control device for an internal combustion engine operates to set the ignition timing by allowing spark discharge of an ignition plug at a suitable timing point matched with the operation of an engine. For example, in an acceleration state of an engine in which the rotation of the engine is increased, the control device operates to advance the ignition timing.

However, if the operational state of an engine is shifted from a low rotational state to a rapid acceleration state, the ignition timing tends to more advanced when compared with the ignition timing actually required for the interior of a combustion chamber. This is because of a variation in the air-fuel ratio caused by a rapid change in the throttle valve opening, a variation in the rate of actual rotation of the engine, and the like. Knocking, acceleration shock, and the like may be caused by the above-mentioned conditions.

To solve such problems, Japanese Patent Laid-open No. Hei 1-232169 discloses a method wherein if a variation in opening of a throttle valve of an internal combustion engine is equal to or more than a specific value, it is determined that the operation is a rapid acceleration operation. The ignition timing is therefore retarded, to thereby moderate shock caused by a change in output of the engine upon rapid acceleration.

The above-described prior art method, however, has a problem. Namely, even when the operational state of the engine is shifted from a low rotational state to a rapid acceleration state, if the shifting of the operational state of the engine is performed from an operation in which the throttle valve is gradually opened to an operation in which the throttle valve is rapidly opened, the rotation of the engine increases easily in accordance with an instruction of rapid acceleration. In this case, it is not necessary to retard the ignition timing, and if the ignition timing is retarded in the same manner as when the operational state of the engine is shifted from a state in which the opening of the throttle valve is kept constant to a rapid acceleration state in which the opening of the throttle valve is made to open rapidly, the operational state of the engine is degraded.

SUMMARY OF THE INVENTION

An object of the present invention is to provide an ignition timing control device for an internal combustion engine, which is capable of preventing the occurrence of shock of the engine by suitably controlling the ignition timing upon rapid acceleration of the engine.

According to the present invention, there is provided an ignition timing control device including: a throttle valve opening detecting means for detecting the opening of a throttle valve of an internal combustion engine; an opening retention detecting means for generating an opening retention detecting signal when said means detects that a varied width of the opening of said throttle valve is kept within a specific width for a first specific time or more in a state where the opening of said throttle valve is smaller than a specific low opening; a means for generating a rapid acceleration detecting signal when said means detects that the opening of said throttle valve is increased from said specific low opening to more than a specific high opening for a second specific time or less directly after generation of said opening retention detecting signal; and a retard control means for retarding the ignition timing of said internal combustion engine in response to said rapid acceleration detecting signal.

With this configuration of the ignition timing control device according to the present invention, when the width of the opening of the throttle valve is kept within a specific width for a first specific time or more when the opening of the throttle valve is smaller than a specific low opening and immediately after the above state, the opening of the throttle valve is increased from the specific low opening to more than a specific high opening for a second specific time or less. It is then determined that the internal combustion engine is in a rapid acceleration state. As a result, it is possible to detect a rapid acceleration state of the engine and retard the ignition timing at the time of the rapid acceleration state of the engine thus detected. Therefore, the occurrence of shock of the engine upon rapid acceleration is prevented.

The opening retention detecting means may take a value obtained by adding a specific value to the opening of said throttle valve detected by said throttle valve opening detecting means as an opening upper limit of said specific width. Alternatively, the opening retention detecting means may take a value obtained by subtracting said specific value from said detected opening of said throttle valve as an opening lower limit of said specific width. With this configuration, it is possible to set a suitable varied width of the opening for each detection of the throttle valve opening.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Hereinafter, one embodiment of the present invention will be described in detail with reference to the drawings.

Figure 1:
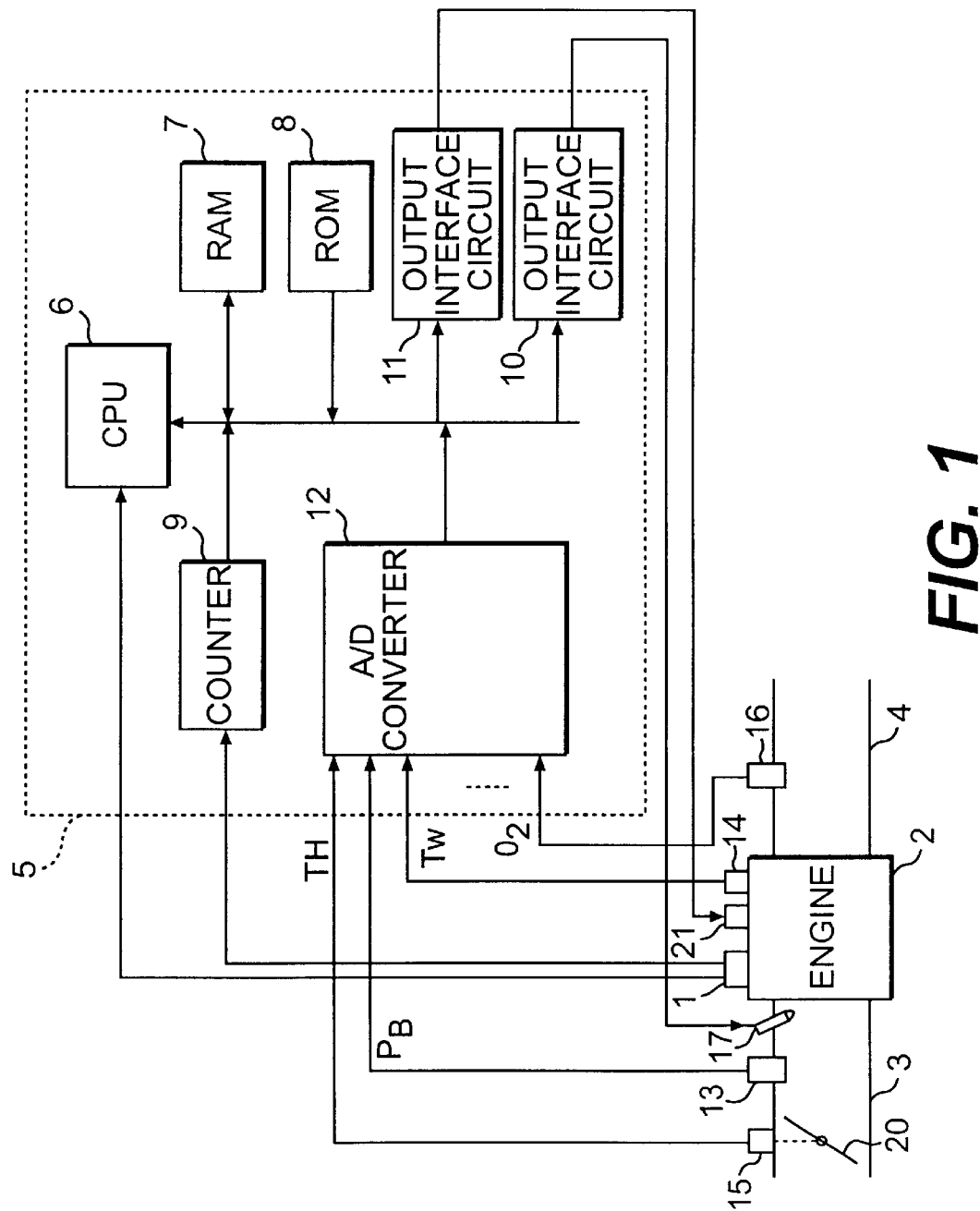
FIG. 1 is a block diagram illustrating an embodiment of the present invention.

FIG. 1 shows an engine control system including an ignition timing control device according to the present invention. In the engine control system, a crank angle sensor 1 is composed of one or a plurality of sets of rotors and electromagnet pickups (both not shown). The projections are made from a magnetic material and are provided around the outer periphery of the rotor spaced from each other at intervals of specific angles. Furthermore, the electromagnetic pickup is disposed near the outer periphery of the rotor. The rotor is rotated together with rotation of a crank shaft (not shown) of the engine, and a crank pulse is generated every time a projection of the rotor passes through the vicinity of the electromagnetic pickup.

The output side of crank angle sensor 1 is connected to an ECU (Electronic Control Unit) 5 which includes a CPU 6, an RAM 7, an ROM 8, a counter 9, output interface circuits 10 and 11, and an A/D converter 12. The counter 9 is reset in response to a crank pulse outputted from the crank angle sensor 1, and counts the number of clock pulses output from a clock generator (not shown) to generate a signal indicating a rotational number Ne of the engine on the basis of the counted number of the clock pulses. The CPU 6, RAM 7, ROM 8, counter 9, output interface circuits 10 and 11, and A/D converter 12 are commonly connected to a bus line.

The A/D converter 12 is provided for converting analog signals supplied from a plurality of sensors into digital signals. The sensors are adapted to detect engine operational parameters required for engine control such as the intake pipe inner pressure $P_B$ a cooling water temperature Tw, a throttle valve opening θTH, and an oxygen concentration $O_2$ in exhaust gas, and the like. The intake pipe inner pressure $P_B$ is detected by an intake pipe inner pressure sensor 13 provided in an intake pipe 3 on the downstream side from a throttle valve 20. The cooling water temperature Tw is detected by a cooling water temperature sensor 14. The throttle valve opening θTH is detected by a throttle valve sensor 15. The oxygen concentration $O_2$ in the exhaust gas is detected by an oxygen concentration sensor 16 provided in an exhaust pipe 4. The oxygen concentration sensor 16 is a binary output type which generates different levels for rich and lean side air-fuel ratios with a theoretical air-fuel ratio taken as a threshold value. The CPU 6 executes a fuel injection control routine previously written in the ROM 8, to determine a fuel injection time Tout using the above engine operational parameters and the rotational number Ne of the engine.

The CPU 6 executes an ignition timing control routine to set the ignition timing, and creates an ignition command in accordance with the ignition timing using an ignition starting control routine. The ignition timing control routine and the ignition starting control routine are previously written in the ROM 8.

The output interface circuit 10 drives an injector 17 in response to an injector drive command supplied from the CPU 6. The injector 17 is provided in the vicinity of an intake port of the intake pipe 3 of the internal combustion engine. The injector 17 is driven to inject fuel on the basis of the injector drive command.

The output interface circuit 11 stops energization to an ignition coil (not shown) of an igniter 21 in response to the ignition command supplied from the CPU 6 to allow an ignition plug (not shown) to generate a spark. In addition, the energization to the ignition coil starts at a predetermined crank angle of the internal combustion engine.

The CPU 6 executes the ignition timing control routine for each specific time (for example, 10 msec) as follows.

Figure 2:
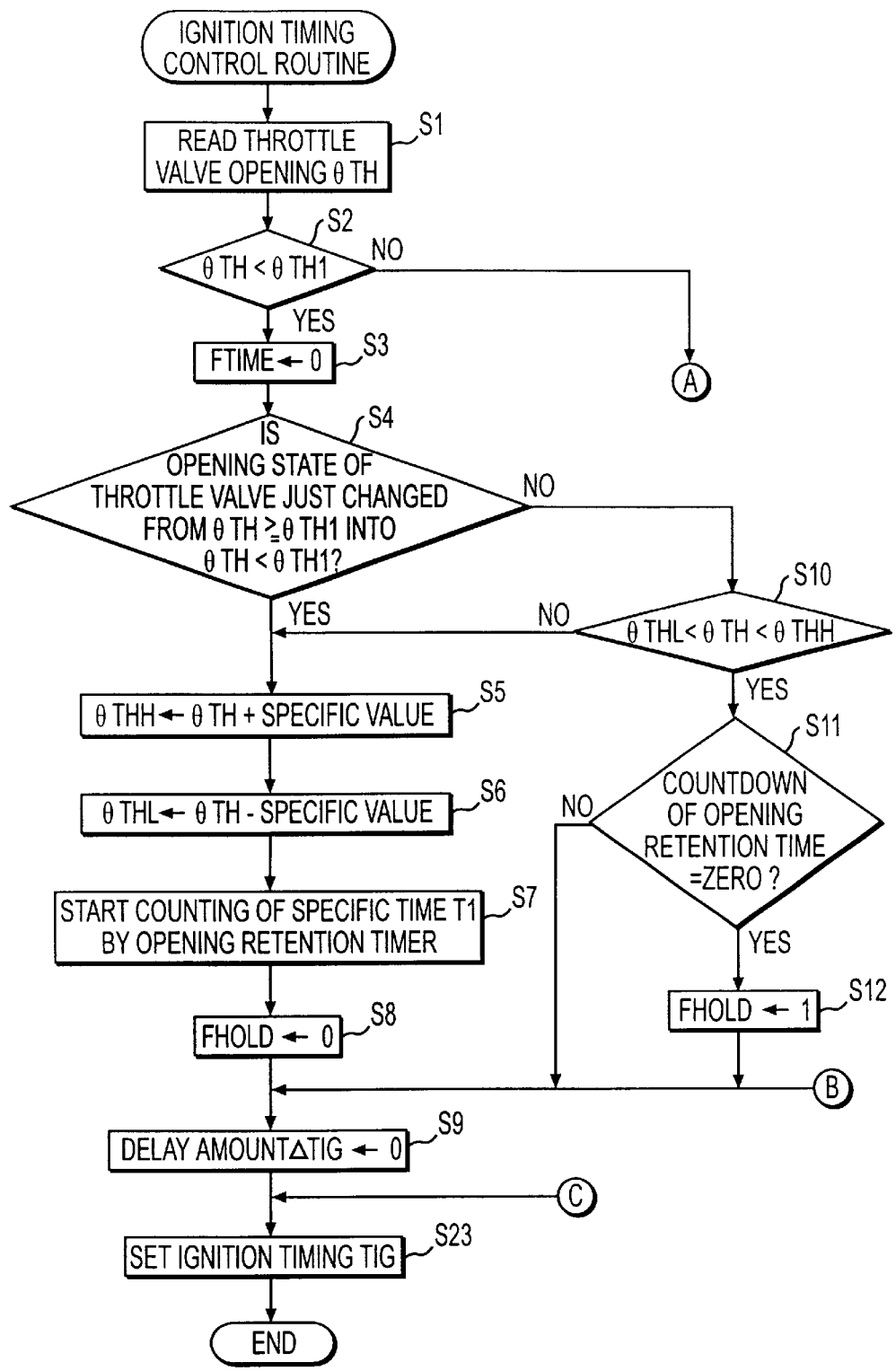
FIG. 2 is a flow chart illustrating an ignition timing control routine of the present invention.

The CPU 6 executes the ignition timing control routine shown in FIGS. 2 and 3 as follows. First, a throttle valve opening θTH is read out (Step S1), and it is decided whether or not the throttle valve opening θTH is smaller than a closing side upper limit opening θTH1 corresponding to a specific low opening, for example 9° (Step S2). If θTH<θTH1, a retard starting counting flag FTIME is reset to zero (Step S3), and it is decided whether or not the present opening state of θTH<θTH1 is the state just changed from the previous opening state of θTH≧θTH1 (Step S4). That is to say, it is detected that upon the previous execution of the ignition timing control routine, it is decided at Step S2 that θTH≧θTH1; however, upon the present execution of the ignition timing control routine, it is decided at Step S2 that θTH<θTH1.

If it is decided at Step S4 that the throttle valve opening θTH has just changed from θTH≧θTH1 to θTH<θTH1, a value obtained by adding a specific value to the throttle valve opening θTH is taken as an opening upper limit θTHH (Step S5), and a value obtained by subtracting a specific value from the throttle valve opening θTH is taken as an opening lower limit θTHL (Step S6). The opening upper limit θTHH and the opening lower limit θTHL are respectively the upper limit and the lower limit of an opening range decidable as a specific width of the present throttle valve opening θTH. After execution of Step S6, an opening retention timer starts counting of a first specific time T1, for example 30 msec (Step S7), and an opening retention flag FHOLD is reset to zero (Step S8). To be more specific, at Step S7, the first specific time T1 is set in the opening retention timer, and the opening retention timer starts counting down. The opening retention timer is in the form of software in this embodiment; however, it may be in the form of hardware. After execution of Step S8, a delay amount ΔTIG is set at zero for performing usual ignition timing control (Step S9).

If it is decided at Step 4 that the throttle valve opening θTH has not just changed from θTH≧θTH1 to θTH<θTH1, it is decided whether or not the throttle valve opening θTH is larger than the opening lower limit θTHL and smaller than the opening upper limit θTHH (Step S10). If θTHL<θTH<θTHH, it is decided whether or not the countdown of the opening retention timer becomes zero (Step S11). If the countdown of the opening retention timer becomes zero, it is regarded that the throttle valve opening θTH satisfies the relationship of θTHL<θTH<θTHH for the specific time T1. At this time, the opening retention flag FHOLD is set to 1 (Step S12), and the process goes on to Step S9.

If it is decided at Step S10 that θTH≦θTHL or θTH≧θTHH, the process goes on to Step S5 and Step S6 at which the opening upper limit θTHH and the opening lower limit θTHL are set again. The process then goes on to Step S7 at which the opening retention timer starts counting down again. If the countdown of the opening retention timer does not become zero, the process goes on to Step S9.

If it is decided at Step S2 that θTH≧θTH1, it is decided whether or not the retard starting counting flag FTIME is equal to 1 (Step S13). When a rapid opening decision timer starts counting of a second specific time T2, the retard starting counting flag FTIME is set at Step S17, which will be described later. If FTIME=0, it is decided whether or not the opening retention flag FHOLD is equal to 1 (Step S14). If FHOLD=1, as described above, it is regarded that the throttle valve opening θTH satisfies the relationship of θTHL<θTH<θTHH for the specific time T1. At this time, the opening retention flag FHOLD is reset to zero (Step S15), and the rapid opening decision flag starts counting of the second specific time T2, for example 20 msec (Step S16). The retard starting counting flag FTIME is then set to 1 (Step S17).

Figure 3:
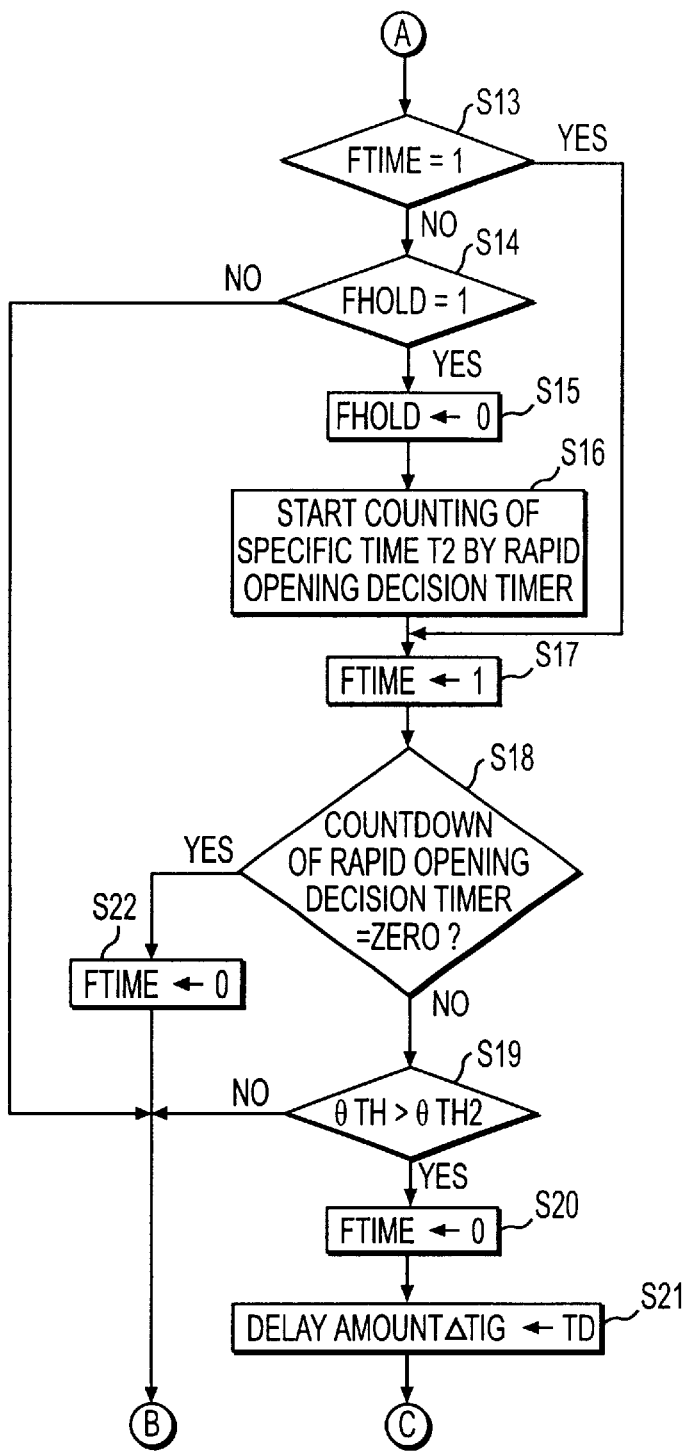
FIG. 3 is a flow chart illustrating a continuation of the ignition timing control routine shown in FIG. 2.

It is decided at Step S13 that FTIME=1, the process directly goes on to Step S17 in the control routine shown in FIG. 3; however, the process may go on to the following step (Step S18).

After execution of Step S17, it is decided whether or not the countdown of the rapid opening decision timer becomes zero (Step S18). If it is decided that the countdown of the rapid opening decision timer does not become zero, it is decided whether or not the throttle valve opening θTH is larger than an opening side lower limit opening θTH2 corresponding to a specific high opening, for example 76° (Step S19). If θTH>θTH2, the operational state of the engine is regarded as being in a rapid acceleration state because the throttle valve opening θTH exceeds the opening side lower limit opening θTH2 before an elapse of the specific time T2. At this time, the retard starting counting flag FTIME is reset to zero (Step S20) and the delay amount ΔTIG is set at a specific value TD so as to retard the ignition timing (Step S21). The specific value TD may be a fixed value or may be retrieved from a data map in the ROM 8 in accordance with the rotational number Ne of the engine.

If it is decided at Step S14 that FHOLD=0, or if it is decided at Step S19 that θTH<θTH2, the process goes on to Step S9. If it is decided at Step S18 that the countdown of the rapid opening timer becomes zero, the retard starting counting flag FTIME is reset to zero (Step S22), and the process goes on to Step S9.

After execution of Step S9 or Step 21, an ignition timing TIG is set by CPU 6 (Step S23). The ignition timing TIG is calculated on the basis of the equation TIG=TIG0 +ΔTIG. The value TIG0 is a basis ignition timing retrieved from a data map in the ROM 8 in accordance with the rotational number Ne of the engine and the intake pipe inner pressure $P_B$ or the throttle valve opening θTH. For example, the basis ignition timing TIG0 is set to become short depending on an increase in the rotational number Ne of the engine and a change of the intake pipe inner pressure $P_B$ on the atmospheric pressure side.

Figure 4:
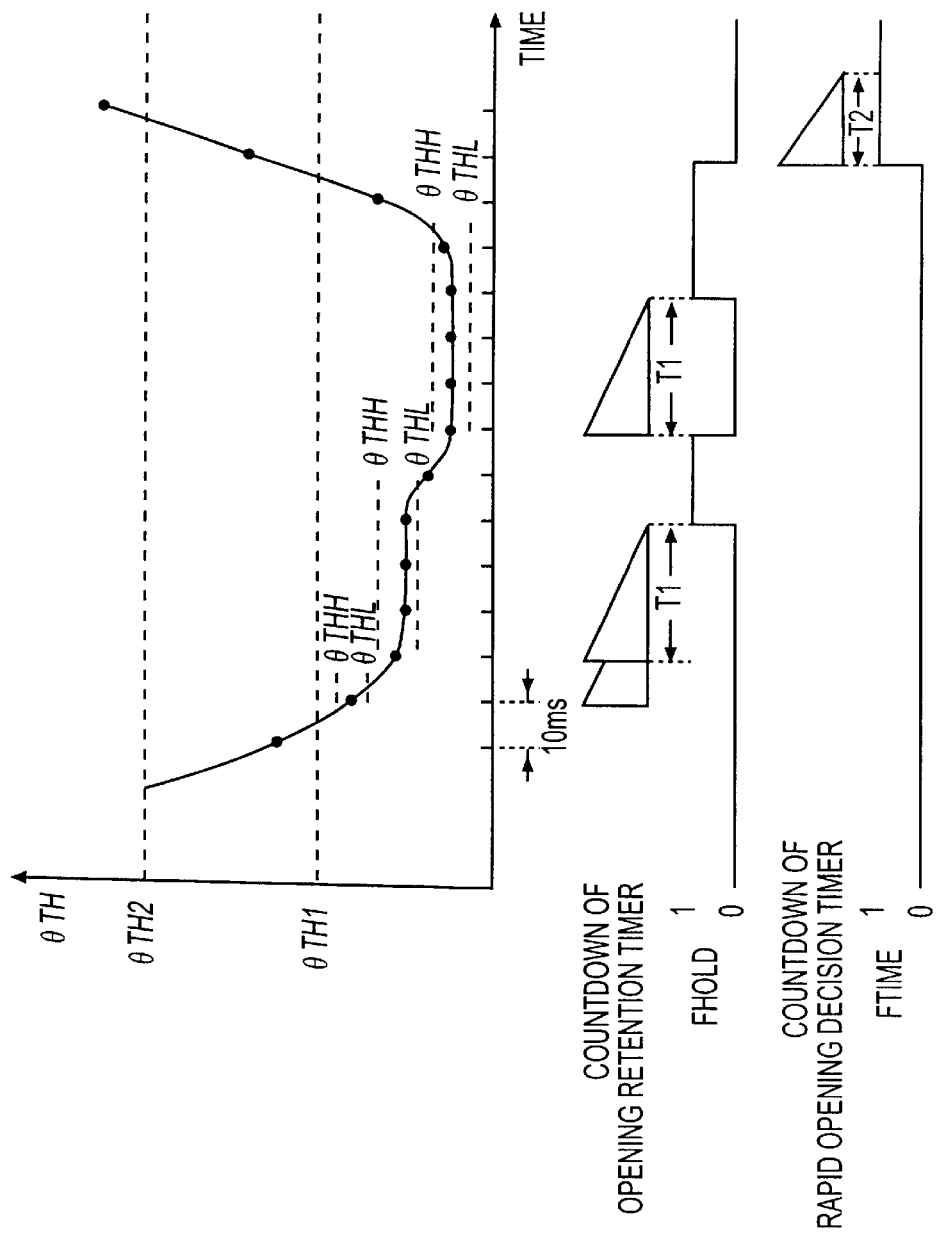
FIG. 4 is a diagram illustrating action of an opening retention timer and a rapid opening decision timer in accordance with a change in opening of a throttle valve and illustrating changes in respective flags.

An example in which the throttle valve opening θTH is changed as shown in FIG. 4 under the above ignition timing control will be described below. When the throttle valve opening θTH becomes smaller than the closing side upper opening θTH1 (θTH<θTH1), the opening upper limit θTHH and the opening lower limit θTHL associated with the throttle valve opening θTH are first set and the opening retention timer starts counting down. If the opening state of θTHL<θTH<θTHH is continued as in idling of the engine, the countdown of the opening retention timer proceeds to zero as shown in FIG. 4, and when the countdown of the opening retention timer becomes zero, the opening retention flag FHOLD is set to 1. If the opening state that θTH≦θTHL or θTH≧θTHH is established even when θTH<θTH1 is detected, the opening upper limit θTHH and the opening lower limit θTHL associated with the throttle valve opening θTH are set again and the opening retention timer starts counting down again.

If the throttle valve opening θTH is rapidly changed, in the state that the opening retention flag FHOLD is set to 1, in the valve opening direction to become larger than the closing side upper limit opening θTH1, the opening retention flag FHOLD is reset to zero and the rapid opening decision timer starts counting down as shown in FIG. 4. At the same time, as shown in FIG. 4, the retard starting counting flag FTIME is set to 1. If the throttle valve opening θTH becomes larger than the opening side lower limit opening θTH2 before the countdown of the rapid opening decision timer becomes zero, it is determined that the rapid acceleration of the engine has begun. At this time, the delay amount ΔTIG is set to retard the ignition timing by the delay amount ΔTIG.

Figure 5:
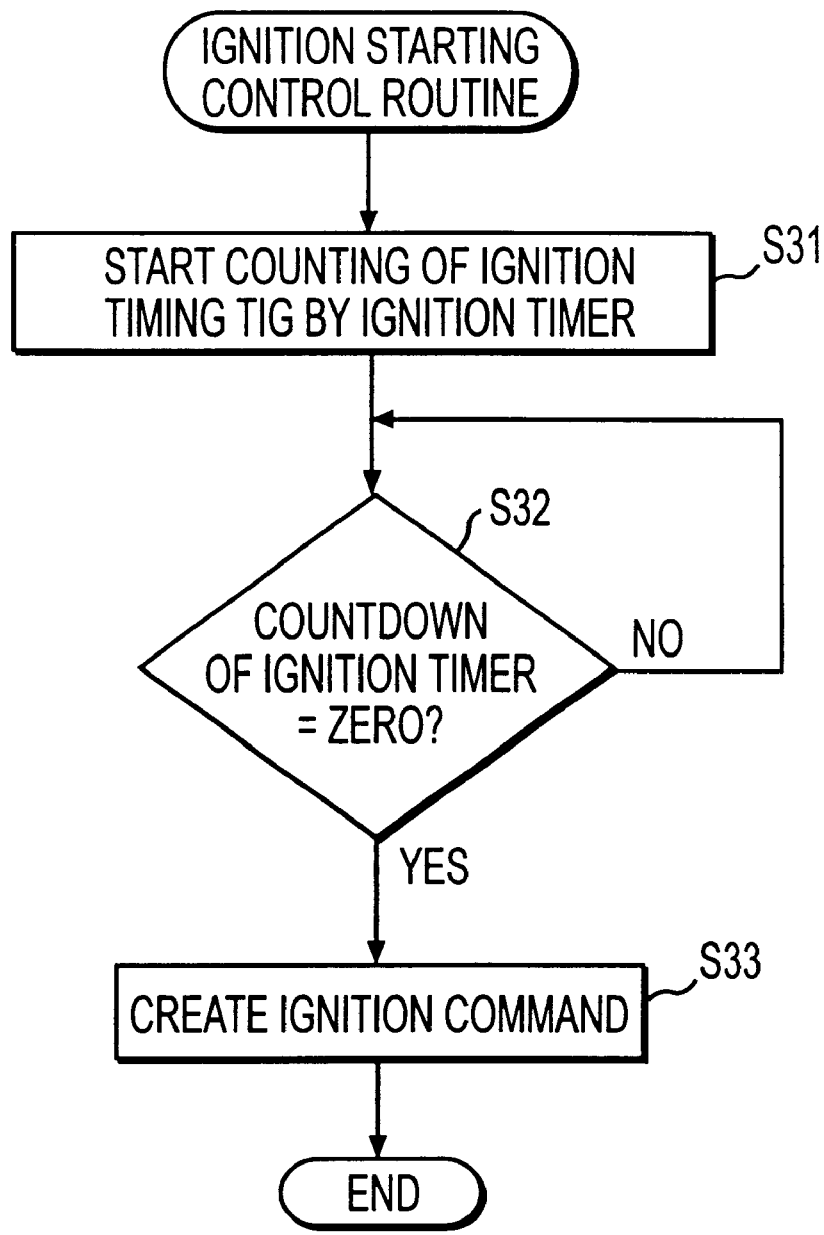
FIG. 5 is a flow chart illustrating an ignition starting control routine of the present invention.

The CPU 6 executes the ignition starting control routine at a specific crank angle based on an output signal from the crank angle sensor. In the ignition starting control routine, as shown in FIG. 5, the ignition timing TIG is set in the ignition timer and the ignition timer starts counting down (Step S31). It is decided whether or not the countdown of the ignition timer becomes zero (Step S32), and if the countdown becomes zero, an ignition command is supplied to the output interface circuit 11 (Step S33). The energization to the ignition coil of the igniter 21 is stopped on the basis of the ignition command supplied from the CPU 6. Therefore, the ignition plug generates a spark. Accordingly, at the time of rapid acceleration of the engine in which the delay amount ΔTIG is set at Step S19, in the retard ignition performed by the ignition plug, spark discharge is retarded by the delay amount ΔTIG.

In the above embodiment, the setting of the opening retention flag when the opening retention timer terminates the counting of the first specific time T1 is equivalent to generation of an opening retention detecting signal; and the setting of the retard starting counting flag when the rapid opening decision timer terminates the counting of the second specific time T2 is equivalent to a rapid acceleration detecting signal. In the above embodiment, retard ignition is performed only when the rapid acceleration detecting signal is generated; however, retard ignition may be continued for a specific time after generation of the rapid acceleration detecting signal.

Each of the opening retention timer, rapid opening decision timer and ignition timer is in the form of software; however, it may be in the form of hardware.

As described above, according to the ignition timing control device of the present invention, when the width of the opening of the throttle valve is kept within a specific width for a first specific time or more in a state where the opening of the throttle valve is smaller than a specific low opening and immediately after, the opening of the throttle valve is increased from the specific low opening to more than a specific high opening for a second specific time or less, it is decided that the internal combustion engine is in a rapid acceleration state. As a result, it is possible to detect the rapid acceleration state shifted from a constant low rotational state of the engine and retard the ignition timing of the engine at the time of the rapid acceleration state thus detected. Therefore, the occurrence of shock of the engine upon rapid acceleration is prevented and suitable ignition timings in other operational-states is obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An ignition timing control device for an internal combustion engine comprising:

a throttle valve opening detecting means for detecting an opening of a throttle valve of the internal combustion engine;

an opening retention detecting means for generating an opening retention detecting signal when said throttle valve opening detecting means detects that a width of the opening of the throttle valve is within a predetermined width for at least a first predetermined time in a state where the opening of the throttle valve is smaller than a predetermined low opening;

means for generating a rapid acceleration detecting signal when said throttle valve opening detecting means detects that the opening of the throttle valve is increased from said predetermined low opening to greater than a predetermined high opening for a second predetermined time or less, immediately after generation of said opening retention detecting signal; and a retard control means for retarding the ignition timing of the internal combustion engine in response to said rapid acceleration detecting signal.

2. An ignition timing control device according to claim 1, wherein said opening retention detecting means obtains a first value by adding a predetermined value to the opening of the throttle valve detected by said throttle valve opening detecting means as an opening upper limit of said predetermined width.

3. An ignition timing control device according to claim 2, wherein said opening retention detecting means obtains a second value by subtracting said specific value from said detected opening of said throttle valve as an opening lower limit of said predetermined width.

4. An ignition timing control device according to claim 1, wherein the retard control means only retards the ignition when the rapid acceleration detecting signal is generated.

5. A method of ignition timing in an internal combustion engine comprising:

detecting an opening of a throttle valve of the internal combustion engine;

generating an opening retention detecting signal when a width of the opening of the throttle valve is within a predetermined width for at least a first predetermined time in a state where the opening of the throttle valve is smaller than a predetermined low opening;

generating a rapid acceleration detecting signal when the opening of the throttle valve is increased from said predetermined low opening to greater than a predetermined high opening for a second predetermined time or less, immediately after generation of said opening retention detecting signal; and retarding the ignition timing of the internal combustion engine in response to said rapid acceleration detecting signal.

6. A method of ignition timing in an internal combustion engine according to claim 5, further comprising the step of:

obtaining a first value by adding a predetermined value to the opening of the throttle valve detected as an opening upper limit of said predetermined width.

7. A method of ignition timing in an internal combustion engine according to claim 6, further comprising the step of:

obtaining a second value by subtracting said specific value from said detected opening of said throttle valve as an opening lower limit of said predetermined width.

8. A method of ignition timing in an internal combustion engine according to claim 5, wherein the step of retarding only occurs when the rapid acceleration detecting signal is generated.

* * * * *